April 6, 1971          R. A. BRUCE          3,574,084
SPECIALIZED HALOGEN GENERATOR FOR PURIFICATION OF WATER
Filed Oct. 9, 1969
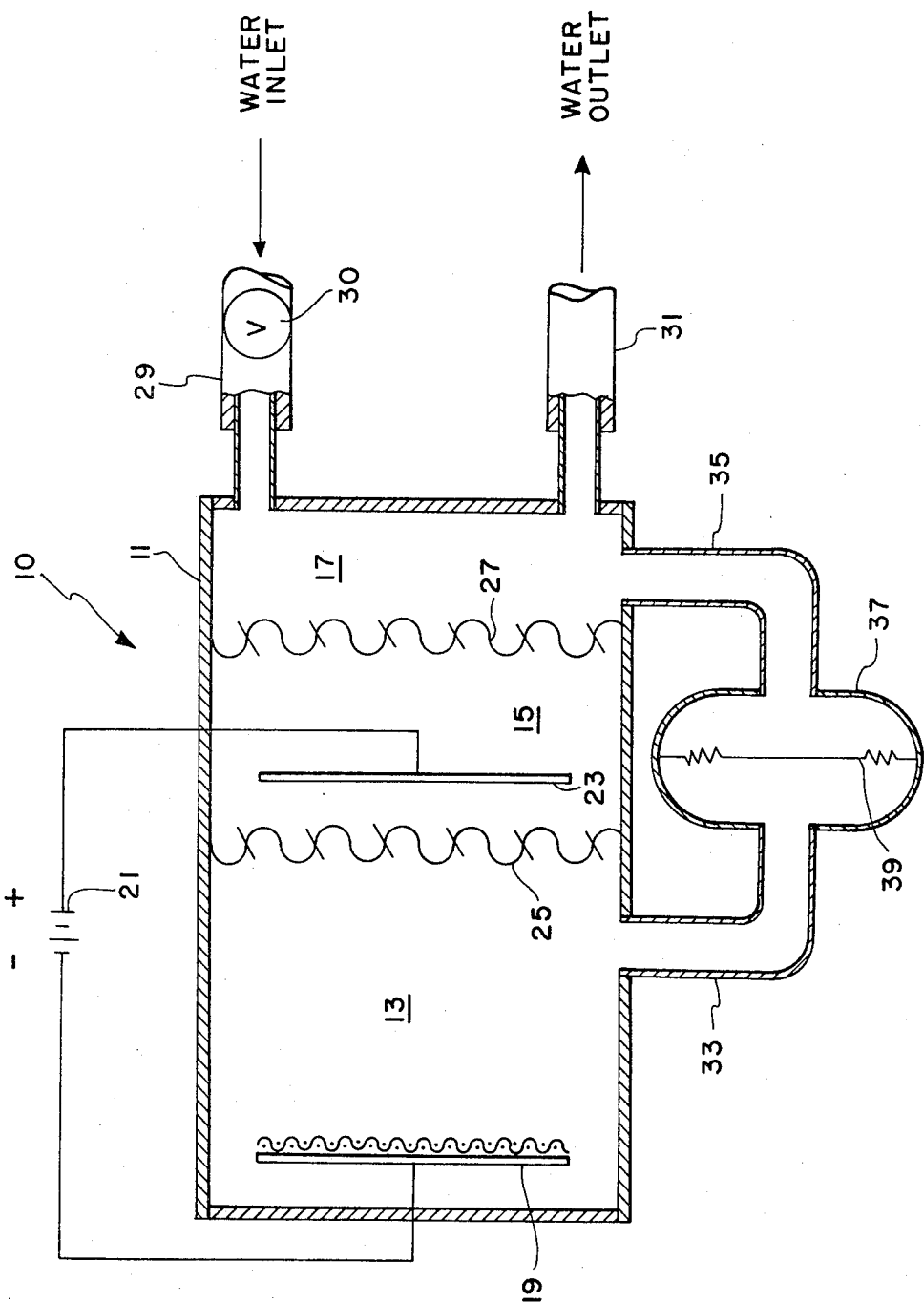
INVENTOR.
ROBERT A. BRUCE
BY
ATTORNEYS

United States Patent Office 3,574,084
Patented Apr. 6, 1971

3,574,084
SPECIALIZED HALOGEN GENERATOR FOR
PURIFICATION OF WATER
Robert A. Bruce, Newport News, Va., assignor to the
United States of America as represented by the Administrator of the National Aeronautics and Space
Administration
Filed Oct. 9, 1969, Ser. No. 865,109
Int. Cl. B01k 3/10
U.S. Cl. 204—263                                11 Claims

ABSTRACT OF THE DISCLOSURE

Apparatus for treating water with a specialized halogen gas including a vessel having an electrolyte containing chamber, an anodic chamber and a water treatment chamber with means to remove the halogen from the electrolyte and permit it to be dissolved in water passing through the water treatment chamber.

ORIGIN OF THE DISCLOSURE

The invention described herein was made by an employee of the United States Government and may be manufactured and used by or for the Government for governmental purposes without the payment of any royalties thereon or therefor.

This invention relates generally to apparatus for generating specialized halogen gases and relates in particular to an apparatus for generating small quantities of halogen gas for disinfecting and purifying contaminated water in integrated life support systems on board spacecraft and the like.

The value of the halogens in general, and in chlorine in particular, has long been recognized as a water purifying agent and today this is one of the primary procedures used to rid contaminated water of bacteria to render it safe for human consumption. Experience with the water management system in an integrated life support system for use in manned space flights of long duration points up a need for a reliable, lightweight and low cost system of sterilizing potable water and maintaining stowed water in an essentially sterile condition.

This sterilizing agent in such a system must be effective, ingestible without harmful effects, and preferably metabolized to inactive products by the body to avoid a gradual buildup in the water recovery system as the waste waters are recycled. Chlorine fills these requirements and there has been a tremendous amount of experience in its use in water treatment. However, chlorine is toxic in the atmosphere and 0.1 p.p.m. is the estimate of the maximum allowable concentration for continuous exposure.

The present invention is designed to generate chlorine as needed by the electrolysis of a chloride solution. Thus, there will never be any appreciable quantity of chlorine present which could be dumped into the atmosphere in the event of a malfunction. The rate of chlorine produced by the present system is controlled by the electric current passed through the cell thereby permitting a simple and rapid adjustment of rate, either manually or by an automatic control tied up to flow rate and chlorine demand.

Selection of the proper chloride to act as the electrolyte will avoid the problems sometimes caused by the production of hydrogen gas at the cathode of the cell. Commercial electrolytic production of chlorine uses a solution of sodium chloride with the following overall reaction:

$$2NaCl + 2H_2O \rightarrow Cl_2 + H_2 + 2\ NaOH$$

This is undesirable for the present invention because the formation of hydrogen gas requires an additional gas-liquid phase separation in zero gravity and the formation of sodium hydroxide would cause undesirable side reactions with the chlorine, such as:

$$6\ NaOH + Cl_2 \rightarrow 5\ NaCl + NaClO_3 + 3\ H_2O$$

When a metal more "noble" than hydrogen is chosen, the electrolysis proceeds by plating out the metal rather than by the evolution of hydrogen. An example of an electrolyte of this type is copper chloride with the electrolysis thereof being represented by the following reaction:

$$CuCl_2 \rightarrow Cu + Cl_2$$

Another suitable example of an electrolyte that is useful in the present invention is a solution of cuprous chloride in sodium chloride. The sodium chloride provides the additional chlorde ions required to dissolve the normally insoluble cuprous chloride, but does not enter the net reaction which may be written as:

$$2CuCl \rightarrow 2Cu + Cl_2$$

Lead chloride would be also satisfactory chemically, but it is too toxic for use near potable water. An electroyte suitable for generation of bromine could be silver bromide in a potassium bromide solution. In this case, as before, the potassium bromide serves only to dissolve the otherwise insoluble silver bromide but does not enter the net reaction:

$$2AgBr \rightarrow Ag + Br_2$$

Accordingly, it is an object of the present invention to provide a new and novel apparatus for purifying a flow of contaminated water.

Another object of the present invention is an apparatus for generating controlled quantities of a halogen gas as needed in a water purifying system.

Another object of the present invention is a reliable, low cost system for producing controlled quantities of chlorine gas.

Another object of the present invention is a system for ridding contaminated water of bacteria to render it safe for human consumption.

Yet another object of the present invention is a chlorine generator for use in a closed integrated life support system on board manned spacecraft for sterilizing potable water and maintaining stowed water in an essentially sterile condition.

According to the present invention the foregoing and other objects are attained by providing a vessel having an electrolyte chamber, an anodic chamber and a water treatment chamber therein. A saturated solution of a suitable electrolyte, such for example copper chloride, is provided in the electrolytic chamber with a cathode immersed in this solution and in electrical connection with a direct current source. An additional undissolved quantity of the solid electrolytic is added to the saturated solution of electrolyte. The solid electrolyte dissolves to maintain a saturated solution as the dissolved electrolyte is consumed by the electrolysis reaction. This is an important feature of the present invention in that it permits loading a large quantity of the halide into a small volume. An anode is disposed in the anodic chamber and also connected to the direct current source. The anodic chamber is separated from the electrolyte chamber only by a hydrophilic membrane and the water treatment chamber is separated from the anodic chamber only by a hydrophobic membrane. Suitable water inlet and water outlet connections are provided in fluid connection with the water treatment chamber with controls being provided to control the rate of flow of the water in the treatment chamber.

When a voltage is applied across the cathode and anode, copper will be plated out at the cathode and chlorine evolved at the anode. This chlorine is permeable through the hydrophobic membrane and passes into the water treatment chamber for absorption by the water therein. By controlling the current the quantity of chlorine may be controlled to that needed for a given flow of water which is also controllable to be within the limits for the chlorine being evolved.

A more complete appreciation of the invention and many of the attendant advantages thereof will be readily apparent as the same becomes better understood with reference to the following detailed description when considered in connection with the accompanying drawings wherein:

The single figure is a sectional view of the water treatment system according to the present invention.

Referring now to the drawing, there is shown a water treatment system according to the present invention and generally designated by reference numeral 10. System 10 includes a vessel 11 having an electrolyte chamber 13, an anodic chamber 15 and a water treatment chamber 17 formed therein. A saturated solution of a suitable electrolyte, plus an excess of solid electrolyte, such for example copper chloride, fills electrolyte chamber 13 and completely immerses a cathode 19 within electrolyte chamber 13. Cathode 19 is preferably formed of a screen or plate of the same metal as the electrolyte, such for example, copper. Cathode 19 is also provided in electrical connection with the negative terminal of a direct electric current source 21.

An anode 23 is disposed within anodic chamber 15 and in electrical connection with the positive terminal of current source 21. Anode 23 may be formed of graphite or other conventional material. Anodic chamber 15 is separated from electrolyte chamber 12 solely by a hydrophilic membrane 25. This membrane may be formed of a porous polyvinyl chloride matrix, or other suitable material that will prevent any appreciable passage of chlorine gas from the anodic chamber back into the electrolyte chamber but will permit the passage of electrolyte.

The anodic chamber 15 is separated from water treatment chamber 17 only by a hydrophobic membrane 27. This membrane may be formed of a porous polyvinylidene fluoride matrix or other suitable hydrophobic material that permits the passage of chlorine gas therethrough but will not permit the passage of liquid water or electrolyte solution.

A suitable water inlet 29 leading from the source of water to be purified serves to admit contaminated water to the water treatment chamber 17 with a suitable control valve 30 being provided in inlet 29 to control the rate of water flow into treatment chamber 17. Water outlet 31 is also provided in fluid connection with treatment chamber 17 and serves to convey the treated water to a suitable stowage tank, not shown.

Conduits 33 and 35 lead, respectively, from electrolyte chamber 13 and water treatment chamber 17 to a pressure equalizing reservoir 37 and serve to secure vessel 11 to equalizing reservoir 37. A suitable slack diaphragm 39 for example polytetrafluoroethylene is disposed intermediate of pressure equalizing reservoir 37 to compensate for pressure changes in electrolyte chamber 13 and water treatment chamber 17 to keep the entire system in essentially a pressure equilibrium condition.

OPERATION

The operation of system 10 is now believed apparent. Initially, electrolyte chamber 13 is filled with crystals of the chosen electrolyte, such for example copper chloride and saturated with water. A portion of the crystals will dissolve forming a saturated solution which will wet hydrophilic membrane 25 and contact anode 23. Hydrophobic membrane 27 prevents any liquid from entering the water treatment chamber 17 from anodic chamber 15. The system may be stored in this condition on board a spacecraft or the like, or where desired until needed.

When used, a small electric potential, for example one volt, is applied to anode 23 and cathode 19 by actuating current source 21 through a suitable switch, not shown. Copper is then plated out on cathode 19 and chlorine ions are attracted to the positive anode 23 where these negative charged ions are neutralized. As each chloride ion loses its electron to become a neutral atom, it combines with another to form a molecule of free chlorine.

$$2Cl^- \rightarrow Cl_2 + 2e^-$$

When the chlorine concentration at the anode exceeds its solubility in the electrolyte solution, chlorine gas will separate and pass through the hydrophobic membrane 27 and dissolve in the water flowing through treatment chamber 17. This process of electrolysis will tend to reduce the concentration of the electrolyte solution to thereby permit more of the solid crystals to dissolve. The pressure equalizing reservoir 37 and its slack diaphragm 39 serve to equalize the pressure on both sides of the anode-membrane assembly and to make up the volume change resulting from consumption of the electrolyte. Hydrophilic membrane 27 prevents any passage of chlorine gas from anodic chamber 15 back into electrolyte chamber 13. In some instances a slight amount of heat may be applied to the anode area to insure that the solubility of chlorine in this region will be less than in the electrolyte chamber 13 to prevent separation of chlorine gas in electrolyte chamber 13. The solubility of a gas is greater in cold water than in warm water. If the water to be treated is cold, this may cool the electrolyte in the anode chamber to a temperature lower than that of the electrolyte chamber. A higher concentration of dissolved chlorine may then occur in the electrolyte in the anode chamber than could remain in solution after diffusing through the hydrophilic membrane into the warmer electrolyte chamber. Making the anode chamber temperature higher will eliminate this potential problem.

It is thus seen that the system of the present invention may generate chlorine as needed by the electrolysis of a chloride solution. Thus, there will never be any appreciable quantity of chlorine present which could be dumped into the atmosphere in the event of vessel rupture or other malfunction. The rate of chlorine generation is also readily controllable by the electric current applied to the cell to thereby permit a simple and rapid adjustment of rate which may be controllable, either manually or by an automatic control tied to flow rate valve 30 and/or to chlorine demand for the water being purified.

Although the invention has been described relative to a specified embodiment thereof it is readily apparent to those skilled in the art that numerous variations and modifications are possible. Also, though a particular electrolyte, cathode, anode, hydrophilic membrane and hydrophobic membrane have been described, the specific examples are to be considered as illustrative only and are not intended as limiting on the invention.

Obviously, many variations and modifications of the present invention are possible in the light of the above teachings. It is therefore to be understod that within the scope of the appended claims the invention may be practiced otherwise than as specifically described herein.

What is claimed as new and desired to be secured by Letters Patent of the United States is:

1. An electrolytic cell for generating controlled quantities of chlorine for purification of water, comprising:
    a vessel,
    an anode and a cathode disposed in spaced relationship within said vessel,
    a source of direct electric current in electrical connection with said cathode and said anode,
    an electrolyte chamber formed in said vessel and containing a saturated solution of an electrolyte,
    said cathode being also positioned within said electrolyte chamber and immersed in said electrolyte, a hydrophilic membrane contained within said vessel and serving to contain said electrolyte within said electrolyte chamber.

a hydrophobic membrane contained within said vessel spaced from said hydrophilic membrane and forming therewith, and with the sidewalls of said vessel, an anodic chamber, said anode being contained within said anodic chamber and spaced from said hydrophilic and said hydrophobic membranes, a water treatment chamber in said vessel and formed by said hydrophobic membrane and the sidewalls of said vessel, water inlet and water outlet means in fluid connection with said water treatment chamber, and a pressure equalizing chamber in fluid connection with said electrolyte chamber and said water treatment chamber.

2. The electrolytic cell of claim 1 wherein said electrolyte is a saturated solution of cuprous chloride in a saturated sodium chloride solution.

3. The electrolytic cell of claim 1 wherein said electrolyte is a saturated solution of silver bromide in a saturated potassium bromide solution.

4. The electrolytic cell of claim 1 wherein said electrolyte is a saturated copper chloride solution.

5. The electrolytic cell of claim 1 wherein said hydrophilic membrane is permeable to said electrolyte and thereby permits said electrolyte to enter said anodic chamber and contact said anode.

6. The electrolytic cell of claim 1 wherein when a potential of approximately one volt is applied to said anode and said cathode by said direct current source, copper will be plated out on said cathode and chlorine evolved at said anode, said hydrophobic membrane having the inherent property characteristic of preventing the passage of electrolyte solution therethrough while permitting said chlorine to pass into said water treatment chamber where said chlorine is dissolved in the water passing through said water treatment chamber.

7. The electrolytic cell of claim 1 wherein said pressure equalizing chamber is divided into substantially equal volume compartments by a slack diaphragm serving to equalize the pressure on both sides of said anodic chamber and to compensate for volume changes resulting from electrolyte consumption.

8. The electrolytic cell of claim 1 wherein said hydrophilic membrane has the inherent physical property characteristic of permitting the passage of dissolved chlorine therethrough while preventing any passage of chlorine gas from said anodic chamber back into said electrolyte chamber.

9. The electrolytic cell of claim 1 wherein said hydrophilic membrane consists of a porous polyvinyl chloride matrix.

10. The electrolytic cell of claim 1 wherein said hydrophobic membrane consists of a porous polyvinylidene fluoride matrix.

11. Apparatus for treating water with a halogen gas comprising:
a vessel,
means defining an electrolyte chamber, an anodic chamber and a water treatment chamber within said vessel,
an electrolyte disposed within said electrolyte chamber,
a cathode disposed in said electrolyte chamber and an anode disposed in said anodic chamber,
a source of direct current in electrical connection with said cathode and said anode,
said anodic chamber being separated from said electrolyte chamber by a hydrophilic membrane,
said water treatment chamber being separated from said anodic chamber by a hydrophobic membrane,
water inlet means leading into said water treatment chamber and water outlet means leading from said water treatment chamber, and
pressure equalizing means in fluid connection with said electrolytic chamber and said water treatment chamber.

References Cited
UNITED STATES PATENTS

| | | | |
|---|---|---|---|
| 1,012,809 | 12/1911 | Bull | 210—192 |
| 799,605 | 9/1905 | Lester | 210—192 |

WINSTON A. DOUGLAS, Primary Examiner

H. A. FEELEY, Assistant Examiner

U.S. Cl. X.R.

210—62, 192